UNITED STATES PATENT OFFICE.

CARL WEHMER, OF HANOVER, GERMANY.

PROCESS OF MAKING CITRIC ACID.

SPECIFICATION forming part of Letters Patent No. 515,033, dated February 20, 1894.

Application filed April 3, 1893. Serial No. 468,847. (No specimens.)

*To all whom it may concern:*

Be it known that I, CARL WEHMER, of Hanover, Germany, have invented certain new and useful Improvements in Methods of Producing Artificial Citric Acid, which are fully described in the following specification.

The object of this invention is the production of citric acid by means of carbon hydrates such as sugar, starch, glycerol and other analogous substances under the influence of certain fungi (*Champignons*) particularly of two hyphomycetes, discovered by myself and called cytromyces.

The spores of the fungi, which are generally present in the air, develop themselves with special facility on sugarlike substances in presence of small quantities of acid. I have isolated two species in a state of purity and I am occupied with isolating other ones. All these fungi produce in sugar solution an intense citric fermentation and their separation is not absolutely necessary for industrial purposes. To prepare these fungi I put in a sugar solution a small quantity—from two to five per cent.—of an organic acid, preferably citric acid and I allow the same to stand for a few days. The sugar solutions used in carrying out this invention should have a strength of from ten to twenty per cent. of sugar. Among other organic acids that may be used in place of citric acid, are tartaric and racemic acids. Acids are used at this stage because the fungus develops better in an acid medium, and it is found that citric acid gives the best results. I collect the fungous growth formed on this solution and I introduce it in a sterilized sugar solution where it develops. The pure culture prepared in this way is then introduced in large vessels containing fifty or more liters of sugar solution and a small quantity of mineral salts ($NH_4NO_3$, $K_2HPO_4$, $MgSO_4$) and the liquid is allowed to stand at the ordinary temperature from eight to fourteen days. After this time the liquid contains a certain amount of citric acid so that it is directly employable like lemon juice. In the chemical changes that occur, the transformation of sugar into citric acid disengages carbonic acid, but the secondary products are unknown. Citric acid is the principal product. The acid can be isolated by evaporation or better in the form of a salt. For the latter purpose it is neutralized with lime or carbonate of lime, or the latter or other convenient salts are added previously to the culture liquid, so that the citric acid is separated as lime salt as soon as it is formed. With citrate of lime citric acid is prepared in the ordinary way.

Where citric acid is mentioned in the claims it is to be understood that its specified equivalent is included.

Having now particularly described and ascertained the nature of my said invention and in what manner the same is to be performed, I declare that what I claim is—

1. The described method of producing citric acid by exposing to the air, a sugar solution acidulated with citric acid until a fungous growth forms thereon, cultivating the spores of fungi in a sterilized sugar solution, introducing the pure culture thus obtained into other sugar solutions, and separating the citric acid formed therein, substantially as described.

2. The described method of producing citric acid by exposing to the air a sugar solution acidulated with an organic acid as set forth until a fungous growth forms thereon, collecting and introducing the fungi into a sterilized sugar solution forming a pure culture, introducing this culture into other sugar solutions and allowing it to stand until citric acid is formed, and converting the acid into a lime salt by means of carbonate of lime, substantially as described.

In witness whereof I have hereunto signed my name in the presence of two subscribing witnesses.

CARL WEHMER.

Witnesses:
 L. A. EDWARDS,
 W. HAUPT.